UNITED STATES PATENT OFFICE 2,490,984

BETA MERCAPTO THIOETHERS

Harold R. Snyder, Urbana, Ill., and John M. Stewart, Berkeley, Calif., assignors to Phillips Petroleum Company, a corporation of Delaware No Drawing. Application May 9, 1947, Serial No. 747,122

14 Claims. (Cl. 260—609)

This invention relates to the production of mono-addition compounds of olefin sulfides and aliphatic mercaptans. More specifically, it relates to a process for the addition of aliphatic mercaptans to olefin sulfides to produce beta-substituted mercaptans, and to the products produced by said process.

Substituted mercaptans of the type produced by the process of this invention are beta mercapto thio-ethers and are potentially valuable in chemical processes, particularly in the manufacture and processing of synthetic rubber, the synthesis of sulphur-containing organic chemicals and the like. Previous attempts to produce such compounds by the interaction of an olefin sulfide with a mercaptan met with little success, the product being generally an indefinite mixture of di-, tri-, and higher addition compounds with little if any of the desired mono-addition products being obtained.

In accordance with this invention beta-substituted mercaptans are produced as mono-addition compounds of olefin sulfide and aliphatic mercaptans. Primary, secondary or tertiary beta-substituted mercaptans may be prepared by the process of this invention. The particular configuration of the product is dependent upon the olefin sulfide employed. For example, ethylene sulfide reacts with primary aliphatic mercaptans to form primary beta-substituted mercaptans; cyclohexene sulfide, secondary beta-substituted mercaptans; and isobutylene sulfide, a mixture of the isomeric primary and tertiary beta-substituted mercaptans.

An object of the present invention is to provide a process for the production of beta-substituted mercaptans. Another object is to provide a process for the production of mono-addition compounds of olefin sulfides and aliphatic mercaptans. Still another object of this invention is to provide beta-substituted mercaptans as new chemical compounds.

New chemical compounds may be prepared by the reaction of an olefin sulfide with an aliphatic mercaptan in accordance with the present invention. The olefin sulfides, of which ethylene sulfide is the simplest member, contain a sulfur atom attached to two directly-connected carbon atoms, which may be represented structurally as follows:

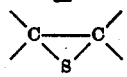

wherein the carbon atoms may be a part of a ring or of an open chain of greater length. As examples of olefin sulfides suitable for use in the process of the present invention, in addition to ethylene sulfide, the following may be mentioned: propylene sulfide, isobutylene sulfide, normal butylene sulfides, higher alkene sulfides, cyclic olefin sulfides, e. g., cyclopentene sulfide, cyclohexene sulfide, and the like, and substituted olefin sulfides, e. g., phenyl propylene sulfide.

The reaction of olefin sulfides with aliphatic mercaptans proceeds according to the following equation:

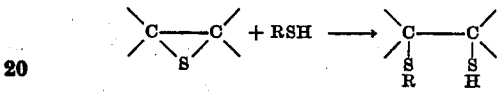

where R is an aliphatic radical attached to the SH group of the mercaptans. Primary, secondary, or tertiary mercaptans may be used for carrying out the reaction with olefin sulfide in accordance with this invention. Unsaturated mercaptans, e. g., butenyl mercaptan, may be used in the process, as well as the more readily available saturated mercaptans. Primary aliphatic mercaptans are, in general, most reactive. The aliphatic mercaptans containing from 2 to 16 carbon atoms per molecule are preferred. It is evident that numerous new chemical compounds may be produced by the present process.

In carrying out the reaction, a mixture of the mercaptan and olefin sulfide is used, usually with the mercaptan present in an amount in excess of that theoretically required for the reaction. Generally it is desirable to form a mixture in which the mercaptan is present in an amount approximately twice the theoretical amount or in 100 per cent molar excess. Desirably, but not necessarily, the reaction mixture is agitated during at least a part of the reaction period.

The reaction may be carried out at various temperatures and pressures and for widely different periods of time. While a temperature within the range of from about 0° C. to about 250° C. may be employed, preferably the reaction temperature is within the range of from about 20° C. to about 160° C. To increase the rate of reaction, it is often desirable to heat the mixture of reactants to a temperature somewhat above normal room temperature (20° C.), but generally not above the boiling point of the mixture. It will be obvious to one skilled in the art that the lower temperatures require increased reaction times and that a temperature above the decomposition temperature of reactants or products should not be employed. The temperature required for optimum rate of reaction will vary with different starting materials, but a temperature of about 100° C. is generally satisfactory for the process. A number of reaction products of olefin sulfides and mercaptans have been prepared by heating the reaction mixture to 100° C. by use of saturated steam at atmospheric pressure. While the reaction is preferably carried out in liquid phase, it may, in some instances, be carried out in vapor phase if desired. A reaction period of from about 1 hour to about 60 hours is suitable for the reaction, but a reaction time of from about 2 to about 24 hours is generally sufficient and preferably employed. While the pressure may be varied over a rather wide range without appreciably affecting the rate of reaction, ordinary atmospheric pressure is conveniently used in carrying out the process of the present invention.

Catalysts which may be used in the process of our invention comprise sodium ethylate (the reaction product of metallic sodium and ethyl alcohol), boron fluoride, and boron fluoride complex catalysts (addition compounds of boron fluoride and other compounds). Of the boron fluoride complexes, the addition product of boron fluoride with diethyl ether and with acetic acid have been found particularly effective. Other carboxylic acids may be used for the preparation of a boron fluoride addition product suitable as a catalyst for our process. The boron fluoride complex is prepared by the addition of boron fluoride to the acid. The reaction between the acid and the boron fluoride is exothermic and should be carried out under conditions such that the temperature does not rise above about 100° C. The boron fluoride-acetic acid addition compound, which contains two mols of acetic acid per mol of boron fluoride, is conveniently prepared by bubbling the boron fluoride through acetic acid. The addition compound formed from equimolecular amounts of boron fluoride and diethyl ether is also a preferred catalyst for the process.

The amount of catalyst employed is variable and may be within the range of from about 0.2 to about 5 mol per cent of the quantity of olefin sulfide employed. Catalyst concentrations of approximately one mol per cent based on the olefin sulfide have been found to be satisfactory. Larger quantities of catalyst may be used but show little, if any, advantage.

In general, the process of our invention comprises forming a mixture of an aliphatic mercaptan and the catalyst and heating the mixture to the reaction temperature after which the olefin sulfide is added slowly with continuous stirring. The rate of addition of the olefin sulfide is preferably such that from about 30 to about 60 minutes is required for the addition. After the addition of the olefin sulfide to the mercaptan, the reaction temperature should be maintained for the remainder of the reaction period. At the end of the reaction period the addition product may be taken up in ether, washed, dried and distilled for recovery of the product in substantially pure form. Distillation of the product is preferably carried out at a pressure of about 5 mm. of mercury absolute or less to avoid any tendency toward decomposition at the boiling temperature.

In a specific embodiment of the present invention a primary mercaptan, such as normal hexyl mercaptan, is reacted with an olefin sulfide, such as isobutylene sulfide. The mercaptan is dissolved in ethanol containing sodium as a catalyst in an amount equivalent to about one mole per cent of the isobutylene sulfide. The isobutylene sulfide is then added slowly to the mixture until a concentration of about 50 per cent on a molar basis of the mercaptan is reached. The mixture is held at the boiling point under reflux conditions for from about 10 to about 20 hours after which the product is taken up in ether, washed with water, and dried over anhydrous sodium sulfate. The crude product is then distilled under reduced pressure. The reaction proceeds according to the following equations to produce a mixture of isomeric, primary and tertiary beta-substituted mercaptans:

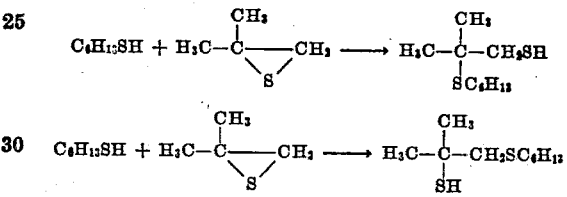

*Example I*

A mixture of nine grams (0.11 mol) of n-butyl mercaptan and two drops of boron fluoride-ether catalyst was placed in a 200-ml. three-necked flask fitted with a mechanical stirrer, reflux condenser and dropping funnel. The mixture was heated to steam cone temperature (100° C.) and 4.4 grams (0.05 mol) of isobutylene sulfide added dropwise with stirring over a period of 45 minutes. The mixture was maintained at the reaction temperature for two hours after which it was cooled and extracted repeatedly with ether. The combined extracts were washed with sodium carbonate solution and saturated sodium chloride solution, dried over anhydrous sodium sulfate, and distilled under a pressure of two mm. of mercury. The product boiled at a temperature of 52–53° C. under a pressure of 2 mm. and had an index of refraction of 1.4938 at 20° C. Amperometric analysis showed the material to be a mixture of the primary and tertiary isomers $$n-C_4H_9S-C(CH_3)_2CH_2SH$$

and $$n-C_4H_9SCH_2C(CH_3)_2SH$$

in the ratio of 72.4 to 27.6.

*Example II*

A series of reactions were carried out in which isobutylene sulfide was reacted with various primary mercaptans. In each instance the preparation was made by adding 0.10 mol of the mercaptan to a solution of 0.01 gram of sodium in 13 ml. of absolute ethanol, followed by 0.05 mol of the sulfide. Heat was evolved in all cases. The mixture was then refluxed for 10–20 hours after which the product was taken up in ether, washed with water and dried over anhydrous sodium sulfate. The crude product was then distilled under reduced pressure. The mercaptans used and the products obtained, together with their properties, are tabulated below:

| Mercaptan | Products | B. P., °C. | Ind. Ref. 20° C. | Per Cent Isomers |
|---|---|---|---|---|
| n-amyl | n-C$_5$H$_{11}$SC(CH$_3$)$_2$CH$_2$SH | 82-84 (3 mm.) | 1.4920 | 59.7 |
|  | n-C$_5$H$_{11}$SCH$_2$C(CH$_3$)$_2$SH |  |  | 40.3 |
| n-hexyl | n-C$_6$H$_{13}$SC(CH$_3$)$_2$CH$_2$SH | 93-96 (3 mm.) | 1.4899 | 56.0 |
|  | n-C$_6$H$_{13}$SCH$_2$C(CH$_3$)$_2$SH |  |  | 44.0 |
| n-heptyl | n-C$_7$H$_{15}$SC(CH$_3$)$_2$CH$_2$SH | 109 (4 mm.) | 1.4856 | 83.3 |
|  | n-C$_7$H$_{15}$SCH$_2$C(CH$_3$)$_2$SH |  |  | 16.7 |
| 2-ethylhexyl | CH$_3$(CH$_2$)$_3$CH(C$_2$H$_5$)CH$_2$SC(CH$_3$)$_2$CH$_2$SH | 119-121 (4.5 mm.) | 1.4885 | 71.9 |
|  | CH$_3$(CH$_2$)$_3$CH(C$_2$H$_5$)CH$_2$SCH$_2$C(CH$_3$)$_2$SH |  |  | 28.1 |
| n-dodecyl | n-C$_{12}$H$_{25}$SC(CH$_3$)$_2$CH$_2$SH | 165-170 (3 mm.) | 1.4845 | 41.4 |
|  | n-C$_{12}$H$_{25}$SCH$_2$C(CH$_3$)$_2$SH |  |  | 58.6 |

*Example III*

A series of reactions were carried out in which cyclohexane sulfide was reacted with various mercaptans. Proportions of reactants, methods, and reaction conditions were substantially the same as in Example II. The mercaptans used and the products obtained together with their properties are shown in the following tabulation:

| Mercaptan | Product | B. P., °C. | Ref. Ind. 20° C. |
|---|---|---|---|
| n-butyl | 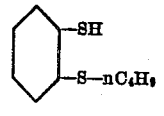 | 109-111 (2.5 mm.) | 1.5234 |
| n-amyl | 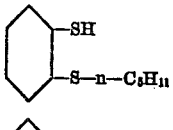 | 123-126 (3.5 mm.) | 1.5186 |
| n-hexyl | 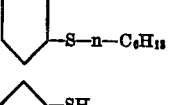 | 130-133 (3 mm.) | 1.5135 |
| n-heptyl | 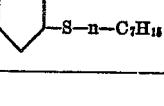 | 141-144 (3 mm.) | 1.5113 |

We claim:
1. The method of producing a beta-substituted mercaptan which comprises reacting an aliphatic mercaptan containing from 2 to 16 carbon atoms per molecule with an olefin sulfide containing from 2 to 9 carbon atoms per molecule in the presence of sodium ethylate as the catalyst.
2. A process for the production of a beta-substituted mercaptan which comprises admixing a primary aliphatic mercaptan containing from 2 to 16 carbon atoms per molecule with a minor proportion of sodium ethylate, and adding an olefin sulfide containing from 2 to 9 carbon atoms per molecule to said mixture at a temperature within the range of 0 to 250° C. with continuous agitation.
3. The method of producing a beta mercapto thio-ether, which comprises reacting one molecular equivalent of an aliphatic mercaptan containing from 2 to 16 carbon atoms per molecule with a molecular equivalent of an olefin sulfide containing from 2 to 9 carbon atoms per molecule in the presence of sodium ethylate as a catalyst, and recovering from the reaction mixture a resulting beta mercapto thio-ether.
4. The method of claim 3 wherein said olefin sulfide is cyclohexene sulfide.
5. The method of producing a beta mercapto thio-ether which comprises reacting one molecular equivalent of isobutylene sulfide with a molecular equivalent of an aliphatic mercaptan containing from 2 to 16 carbon atoms per molecule in the presence of sodium ethylate as a catalyst, and recovering from the reaction mixture a resulting beta mercapto thio-ether.
6. A process for the production of a beta mercapto thio-ether which comprises admixing a primary aliphatic mercaptan containing from 2 to 16 carbon atoms per molecule with a minor proportion of sodium ethylate, adding to the resulting mixture an olefin sulfide containing from 2 to 9 carbon atoms per molecule with continuous agitation at a temperature within the range from about 20° C. to about 160° C., said olefin sulfide being added at a rate such that a quantity equivalent to about fifty per cent of the theoretical quantity required for reaction with said mercaptan is added to said mixture over a period of at least 30 minutes.

7. A process for the production of a beta mercapto thio-ether which comprises admixing a primary aliphatic mercaptan containing from 2 to 16 carbon atoms per molecule with a minor proportion of sodium ethylate, adding isobutylene sulfide to the resulting admixture with continuous agitation at a temperature within the range from about 20° C. to about 160° C., said isobutylene sulfide being added at a rate such that a quantity equivalent to about fifty per cent of the theoretical quantity required for reaction with said mercaptan is added to said mixture over a period of about 30 to about 60 minutes.

8. The process of claim 6 wherein said olefin sulfide is cyclohexene sulfide.

9. A process for the production of a beta mercapto thio-ether which comprises reacting a molecular equivalent of a primary aliphatic mercaptan containing from 2 to 16 carbon atoms per molecule with one molecular equivalent of isobutylene sulfide in the presence of sodium ethylate as a catalyst, the proportion of said sodium ethylate in the reaction mixture being in the range of from about 0.2 to about 5 mol per cent of the amount of said isobutylene sulfide therein, effecting said reacting at a temperature in the range of from 20 to 160° C. for a duration of at least one hour, and recovering from the reaction mixture a resulting beta mercapto thioether.

10. A process for the production of a beta mercapto thio-ether which comprises admixing a primary aliphatic mercaptan containing from 2 to 16 carbon atoms per molecule with a minor proportion of sodium ethylate, gradually adding to the resulting admixture an olefin sulfide with continuous agitation at a temperature within the range from about 0 to about 250° C., said olefin sulfide containing from 2 to 9 carbon atoms per molecule being added at a rate such that a quantity equivalent to about fifty per cent of the theoretical quantity required for reaction with said mercaptan is added.

11. The process of claim 1 wherein said mercaptan is n-butyl mercaptan and said olefin sulfide is isobutylene sulfide.

12. The process of claim 1 wherein said mercaptan is an n-amyl mercaptan.

13. The process of claim 1 wherein said olefin sulfide is a cyclic olfin sulfide.

14. The process of claim 1 wherein said sulfide is an aliphatic olefin sulfide.

HAROLD R. SNYDER.
JOHN M. STEWART.

REFERENCES CITED

The following references are of record in the file of this patent:

UNITED STATES PATENTS

| Number | Name | Date |
|---|---|---|
| 2,402,878 | Doumani | June 25, 1946 |

FOREIGN PATENTS

| Number | Country | Date |
|---|---|---|
| 696,774 | Germany | Sept. 28, 1940 |
| 351,034 | Italy | Aug. 2, 1937 |